(12) United States Patent
Kurokawa et al.

(10) Patent No.: US 12,208,754 B2
(45) Date of Patent: Jan. 28, 2025

(54) IN-VEHICLE NETWORK SYSTEM

(71) Applicants: Mazda Motor Corporation, Hiroshima (JP); Toyota Jidosha Kabushiki Kaisha, Toyota (JP)

(72) Inventors: Yoshimasa Kurokawa, Hiroshima (JP); Tetsuhiro Yamashita, Hiroshima (JP); Takahiro Hirano, Toyota (JP)

(73) Assignees: MAZDA MOTOR CORPORATION, Hiroshima (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 375 days.

(21) Appl. No.: 17/638,857

(22) PCT Filed: Aug. 21, 2020

(86) PCT No.: PCT/JP2020/031606
§ 371 (c)(1),
(2) Date: Feb. 28, 2022

(87) PCT Pub. No.: WO2021/039626
PCT Pub. Date: Mar. 4, 2021

(65) Prior Publication Data
US 2022/0297617 A1 Sep. 22, 2022

(30) Foreign Application Priority Data

Aug. 30, 2019 (JP) ................. 2019-158744

(51) Int. Cl.
*B60R 16/023* (2006.01)
*H04L 12/40* (2006.01)
*H04L 67/12* (2022.01)

(52) U.S. Cl.
CPC ............ *B60R 16/023* (2013.01); *H04L 12/40* (2013.01); *H04L 67/12* (2013.01); *H04L 2012/40273* (2013.01)

(58) Field of Classification Search
CPC ....... B60R 16/023; H04L 12/40; H04L 67/12; H04L 2012/40273
(Continued)

(56) References Cited

U.S. PATENT DOCUMENTS 4,722,576 A * 2/1988 Matsuda .................. B60T 8/90
303/116.1
6,111,373 A * 8/2000 Ohashi .................... E05F 15/40
318/446
(Continued)

FOREIGN PATENT DOCUMENTS

CN 105388801 A 3/2016
EP 2990291 A2 3/2016
(Continued)

OTHER PUBLICATIONS

Zimu Zhang et al., Fault-Tolerant Control of Autonomous Underwater Vehicle Actuators Based on Takagi and Sugeno Fuzzy and Pseudo-Inverse Quadratic Programming under Constraints, May 10, 2024, mdpi.com, pp. 1-20.*
(Continued)

*Primary Examiner* — Manglesh M Patel
(74) *Attorney, Agent, or Firm* — XSENSUS LLP

(57) ABSTRACT

An in-vehicle network system includes a central ECU, which generates a control signal for a plurality of devices, and a plurality of zone ECUs, which relay a control signal from the central ECU. The plurality of devices include a first specific device (power window device, etc.), which is a device unrelated to drive control or the like of a vehicle, and which includes a sub controller (third signal processing unit, etc.) capable of activating an actuator based on an ON signal from at least one or some of the sensors. The first specific device is configured to control the actuator by using the sub
(Continued)

controller in occurrence of abnormality of communication between the central ECU and the first specific device.

12 Claims, 2 Drawing Sheets

(58) Field of Classification Search
USPC .................. 701/36, 29.9, 30.1, 31.6, 29.2
See application file for complete search history.

(56) References Cited

U.S. PATENT DOCUMENTS

| | | | |
|---|---|---|---|
| 7,620,465 B2 * | 11/2009 | Degoul | B60T 17/22 700/20 |
| 10,331,128 B1 * | 6/2019 | Hansel | H04L 9/30 |
| 2005/0212470 A1 | 9/2005 | Noro et al. | |
| 2006/0015231 A1 | 1/2006 | Yoshimura et al. | |
| 2009/0015976 A1 * | 1/2009 | Hara | B60R 16/023 361/64 |
| 2011/0112716 A1 * | 5/2011 | Joeng | B60W 50/0205 701/41 |
| 2014/0188343 A1 | 7/2014 | Yoshimura et al. | |
| 2014/0288776 A1 | 9/2014 | Anderson et al. | |
| 2015/0100207 A1 | 4/2015 | Yoshimura et al. | |
| 2015/0134199 A1 * | 5/2015 | Fraser-Chanpong | B60W 10/00 701/36 |
| 2016/0059853 A1 | 3/2016 | Yamakoshi et al. | |
| 2016/0355179 A1 | 12/2016 | Cannella et al. | |
| 2017/0070382 A1 * | 3/2017 | You | H04L 41/0668 |
| 2017/0297570 A1 | 10/2017 | Yamakoshi et al. | |
| 2017/0317515 A1 * | 11/2017 | Satake | B60R 16/03 |
| 2019/0220004 A1 * | 7/2019 | Von Novak, III | B64D 35/00 |
| 2020/0112163 A1 * | 4/2020 | Revach | H01H 71/70 |
| 2020/0282965 A1 * | 9/2020 | Pieronek | H04L 12/40 |
| 2023/0135176 A1 * | 5/2023 | Yang | B60N 2/56 701/36 |

FOREIGN PATENT DOCUMENTS

| | | |
|---|---|---|
| JP | 2005-273421 A | 10/2005 |
| JP | 2006-51922 A | 2/2006 |
| JP | 3912218 B2 | 5/2007 |
| JP | 2019-23002 A | 2/2019 |

OTHER PUBLICATIONS

International Search Report and Written Opinion mailed on Oct. 6, 2020, received for PCT Application PCT/JP2020/031606, Filed on Aug. 21, 2020, 10 pages including English Translation.

* cited by examiner

IN-VEHICLE NETWORK SYSTEM

CROSS-REFERENCE TO RELATED APPLICATIONS

The present application is based on PCT/JP2020/031606 filed on Aug. 21, 2020, and claims priority to Japanese Application No. 2019-158744 filed on Aug. 30, 2019, the entire contents of each are incorporated herein by reference.

TECHNICAL FIELD

The technology disclosed herein belongs to a technical field related to an in-vehicle network system.

BACKGROUND ART

In recent years, the electrification of in-vehicle devices has been remarkable, and it has come to control the movement of vehicles using electronic control.

For example, PTL 1 discloses a vehicle communication system configured as follows: various electric apparatuses capable of communicating data via a communication line are divided into groups; for each group, electric apparatuses are connected to each other via a communication line for data communication; and a specific electric apparatus capable of relaying data (control signal) between communication lines of the individual groups is connected between the communication lines, thereby allowing all the electric apparatuses connected to each communication line to transmit and receive data to and from each other via the communication line.

In PTL 1, in response to detection of abnormality and an abnormal portion of a data transmission path, data passing through the abnormal portion is identified, and a detour path through which the identified data is transmittable without having to go through the abnormal portion is set, thereby allowing the data to be transmitted by taking the detour path.

CITATION LIST

Patent Literature

PTL 1: Japanese Patent No. 3912218

SUMMARY OF INVENTION

Technical Problem

When a detour path for a control signal is set as in PTL 1, even in the case of occurrence of abnormality in a communication line, the control signal may be transmitted to a target device. However, because a transmission path for a control signal is generally set so that the control signal will reach a target device in the shortest time, if a detour path is taken, it takes long time for the control signal to reach the target device.

In a vehicle, there are some devices such as a power window device that require high responsiveness even if communication abnormality occurs in the event of collision of the vehicle or the like. For such devices, it is desirable not only to improve redundancy, but also to enhance responsiveness as much as possible even in the event of communication abnormality.

The technology disclosed herein has been made in view of these points, and it is an object thereof to, for a specific device, enhance redundancy and to achieve as high responsiveness as possible even in the event of communication abnormality.

Solution to Problem

In order to solve the above problems, the technology disclosed herein targets an in-vehicle network system including: a plurality of sensors; a central control apparatus configured to generate a control signal for a plurality of devices based on an output of each of the sensors; and a plurality of relay apparatuses, each being provided on communication paths between the central control apparatus and each of the devices, configured to relay a control signal generated by the central control apparatus, wherein: the plurality of devices include a first specific device, which is a device unrelated to drive control, brake control, or steering control of a vehicle, and which includes a sub controller capable of activating an actuator based on an ON signal from at least one or some of the sensors, and the first specific device is configured to control the actuator by using the sub controller in occurrence of abnormality of communication between the central control apparatus and the first specific device.

According to this configuration, the first specific device is capable of controlling the actuator by using the sub controller in the first specific device in occurrence of abnormality of communication with the central control apparatus. Accordingly, redundancy of the first specific device may be enhanced. In addition, because the device itself has the controller, a path for transmitting a control signal to the actuator becomes much shorter, thereby considerably enhancing the responsiveness of activating the actuator. Therefore, for the first specific device, redundancy may be enhanced, and responsiveness as high as possible may be achieved even in the event of communication abnormality.

In the in-vehicle network system, a signal from, among the plurality of sensors, a first specific sensor only related to the operation of the first specific device may be configured to be directly input to the first specific device; the central control apparatus may be configured to generate a control signal for each first specific device based on outside-vehicle environment information, which is information obtained from an output of each of the sensors and which is related to external environment of the vehicle; and, in response to an input of a control signal based on the outside-vehicle environment information from the central control apparatus in absence of the communication abnormality, the sub controller of the first specific device may be configured to control the actuator based on the control signal, whereas, in response to an input of a signal from the first specific sensor, the sub controller may be configured to control the actuator based on the signal from the first specific sensor, regardless of a control signal from the central control apparatus.

According to this configuration, even in absence of abnormality of communication with the central control apparatus, control based on a signal from the first specific sensor may be executed only by the sub controller. Accordingly, a communication path when activating the actuator using a signal from the first specific sensor remains the same regardless of the presence or absence of abnormality of communication with the central control apparatus. As a result, high responsiveness may be more easily achieved even in the event of abnormality of communication with the central control apparatus.

In an embodiment of the in-vehicle network system, the plurality of devices include a second specific device, which is a device related to drive control, brake control, or steering control of the vehicle; the second specific device is connected to a relay apparatus via a specific control apparatus that controls the second specific device; the specific control apparatus includes a specific arithmetic unit to which a detection signal from a second specific sensor among the plurality of sensors is input, the second specific sensor detecting a value related to an output of the second specific device, the specific arithmetic unit being capable of generating a control signal for the second specific device based on a signal from the second specific sensor; and the specific arithmetic unit generates a control signal for the second specific device in occurrence of abnormality of communication between the central control apparatus and the second specific device.

According to this configuration, the second specific device may also be controlled by the specific control apparatus in occurrence of abnormality of communication with the central control apparatus. Accordingly, redundancy of the second specific device may be enhanced. In addition, because the specific control apparatus is provided on a communication path between the relay apparatus and the second specific device, the time of communicating a control signal from the specific control apparatus to the second specific device may be shortened as much as possible. Therefore, also for the second specific device, redundancy may be enhanced, and responsiveness as high as possible may be achieved even in the event of communication abnormality.

In the embodiment, the central control apparatus may be configured to calculate a target output of each second specific device based on outside-vehicle environment information, which is information obtained from an output of each of the sensors and which is related to external environment of the vehicle; and the specific arithmetic unit may be configured to, in absence of abnormality of communication between the central control apparatus and the second specific device, generate a control signal for the second specific device so as to make an output of the second specific device the target output calculated by the central control apparatus.

According to this configuration, the central control apparatus is configured to merely calculate a target output of the second specific device based on outside-vehicle environment information, and the actual control amount of the second specific device is calculated by the specific control apparatus. In contrast, control based on the second specific sensor, which is executed in occurrence of abnormality of communication between the central control apparatus and the second specific device, is control that calculates, by the specific control apparatus, the control amount of the second specific device based on a value related to an output of the second specific device, which is detected by the second specific sensor. That is, the operation of the specific control apparatus remains almost unchanged even in occurrence of abnormality of communication with the central control apparatus. As a result, deterioration of responsiveness for the second specific device in the event of abnormality of communication with the central control apparatus is effectively suppressed.

In the embodiment, regardless of presence or absence of abnormality of communication between the central control apparatus and the second specific device, for part of control of the second specific device, the specific arithmetic unit may be configured to generate a control signal for the second specific device based on a signal from the second specific sensor.

For example, in the case of using an internal combustion engine as a power source, particularly high responsiveness is required in control for suppressing knocking. Therefore, control for suppressing knocking or the like is executed by the specific control apparatus, without having to go through a central control apparatus. Accordingly, for a device whose control requires particularly high responsiveness, redundancy may be enhanced, and particularly high responsiveness may be achieved even in the event of communication abnormality.

Advantageous Effects of Invention

As described above, according to the technology disclosed herein, for a specific device, redundancy may be enhanced, and responsiveness as high as possible may be achieved even in the event of communication abnormality.

DESCRIPTION OF EMBODIMENTS

Hereinafter, an exemplary embodiment will be described in detail with reference to the drawings.

Figure 1:
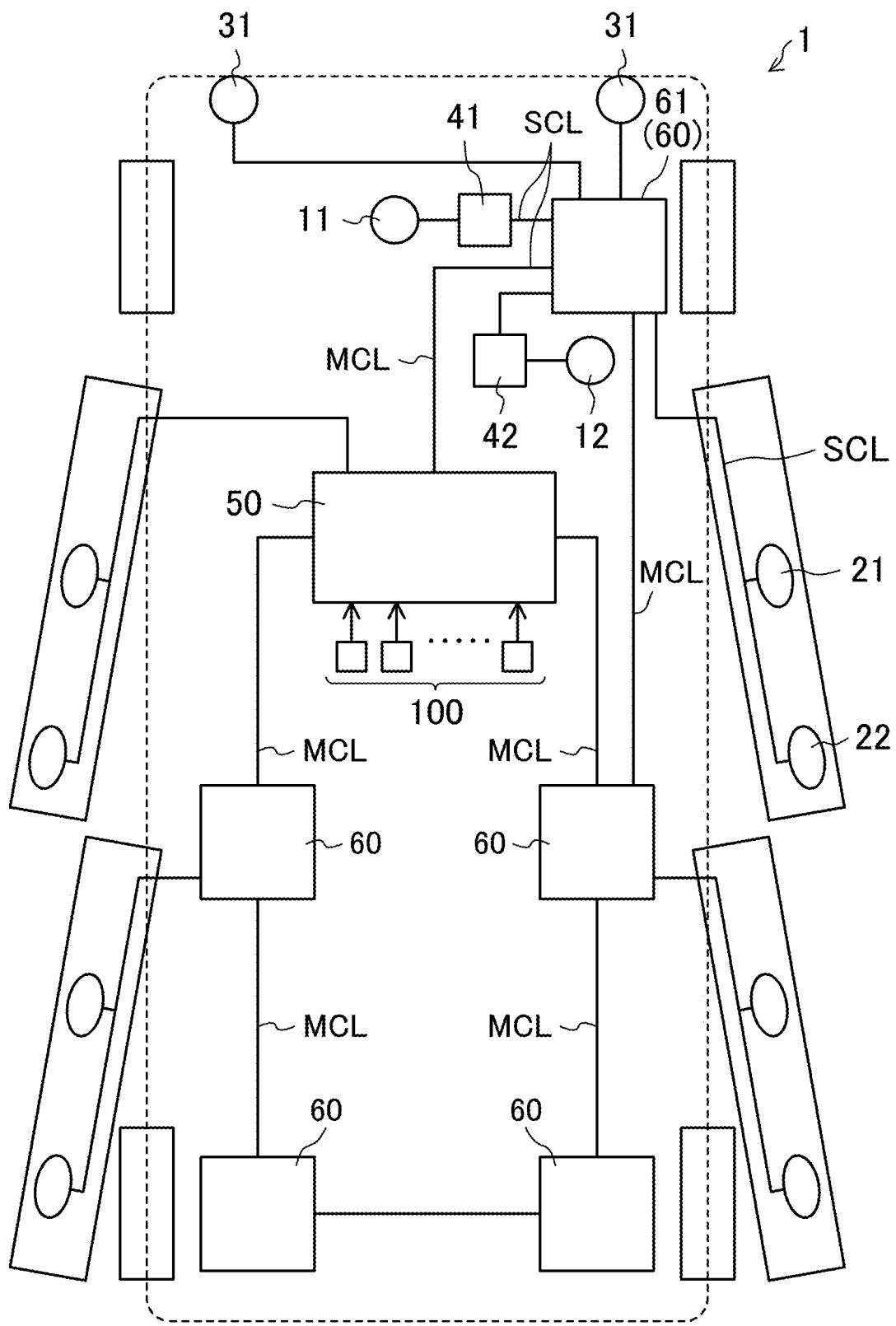
FIG. 1 is a schematic diagram illustrating part of an in-vehicle network system according to an exemplary embodiment.

FIG. 1 schematically illustrates part of an in-vehicle network system 1 according to the present embodiment. The vehicle is, besides a manually driven vehicle driven by the driver's operation, a driver-assisted vehicle driven with assistance for the driver's operation, and an autonomous vehicle driven without the driver's operation. The vehicle adopts by-wire technology, which performs control electrically in drive control, brake control, and steering control. That is, in this vehicle, sensors are configured to detect the operations of the acceleration pedal, the operations of the brake pedal, and the operations of the steering wheel, and actuators are activated by control signals based on the outputs of these sensors.

The in-vehicle network system 1 includes a plurality of types of in-vehicle devices, as illustrated in FIG. 1. The in-vehicle devices include basic devices related to driving, braking, or steering, which are the basic operations of the vehicle, and body-system devices unrelated to driving, braking, or steering. Note that the in-vehicle devices illustrated in FIG. 1 are examples of in-vehicle devices included in the in-vehicle network system 1, and this does not exclude the in-vehicle network system 1 including an in-vehicle device other than the in-vehicle devices illustrated in FIG. 1.

In the present embodiment, the in-vehicle devices are mainly classified into three types. The first type includes in-vehicle devices that are related to the basic operations of the vehicle, and that are required to be continuously controlled even in an emergency. The second type includes in-vehicle devices that are unrelated to the basic operations of the vehicle, and that need to be distinguished between operation and non-operation depending on the vehicle state in an emergency. The third type includes in-vehicle devices that are unrelated to the basic operations of the vehicle, and that are simply required to maintain either the state of operation or non-operation regardless of the vehicle state in an emergency. Hereinafter, in-vehicle devices belonging to the first type will be referred to as basic devices, in-vehicle devices belonging to the second type will be referred to as selective devices, and in-vehicle devices belonging to the third type will be referred to as fixed devices.

The basic devices include, for example, an engine system 11, an electric power steering device (EPS device) 12, an automatic transmission, an electric brake device, etc. The engine system 11 includes a throttle valve, a valve opening/closing mechanism, a fuel injection valve, etc. The EPS device 12 includes an electric motor, an oil pump in the case of a hydraulic system, etc. The selective devices include a power window device 21 (hereinafter referred to as a P/W device 21), a keyless entry device 22, a wiper device, a grille shutter, etc. The fixed devices include headlights 31, fog lights, a horn, a security alarm, etc. Note that the engine system 11 and the EPS device 12 are examples of a second specific device, and the P/W device 21 and the keyless entry device 22 are examples of a first specific device.

To control the operation of various in-vehicle devices, the vehicle includes a central ECU 50 (Electric Control Unit) serving as a central control apparatus, and a plurality of (five in FIG. 1) zone ECUs 60 configured to be capable of communicating with the central ECU 50.

The central ECU 50 and the zone ECUs 60 are each a piece of computer hardware, and each specifically includes a processor including a CPU, a memory storing a plurality of modules, etc. Each ECU may include a plurality of processors and a plurality of memories.

The central ECU 50 generates a control signal for controlling each in-vehicle device mounted in the vehicle. In the in-vehicle network system 1, a control signal for each in-vehicle device is basically generated by the central. ECU 50, and is transmitted to each in-vehicle device via a zone ECU 60 and/or the like.

Figure 2:
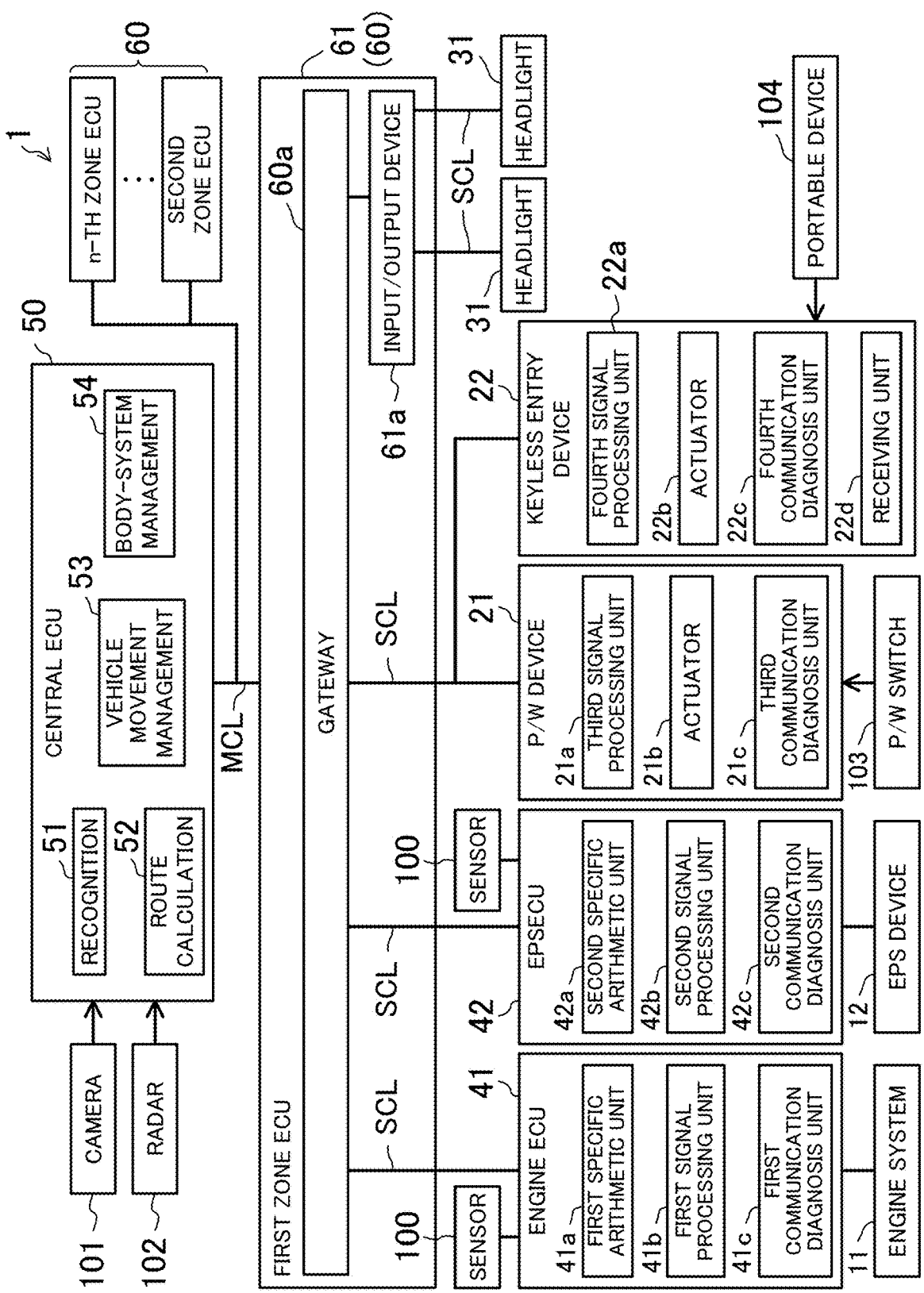
FIG. 2 is a block diagram illustrating the configuration of a central ECU and a zone ECU on the driver's side.

As illustrated in FIGS. 1 and 2, signals from a plurality of sensors 100 mounted in the vehicle are input to the central ECU 50. The plurality of sensors 100 include, for example, a plurality of cameras 101, which are provided on the body or the like of the vehicle, and which capture images of the outside-vehicle environment, and a plurality of radars 102, which are provided on the body or the like of the vehicle, and which detect targets or the like outside the vehicle. In addition, the plurality of sensors 100 include a position sensor that detects the position of the vehicle (vehicle position information) using the Global Positioning System (GPS), a passenger state sensor that obtains the state of a passenger of the vehicle including the presence or absence of a passenger of the vehicle, a brake pedal sensor that obtains the amount of the brake pedal depressed by the vehicle's driver, a steering angle sensor that obtains the steering angle of steering by the vehicle's driver, an accelerator opening sensor that obtains the amount of the acceleration pedal depressed by the vehicle's driver, etc. Note that the sensors 100 mentioned here are examples of sensors that input information to the central ECU 50, and the present embodiment does not exclude information being input from a sensor other than these sensors to the central ECU 50.

The cameras 101 are respectively arranged so that they can capture images 360° horizontally around the vehicle. Each camera 101 captures an optical image indicating the outside-vehicle environment, and generates image data. Each camera 101 outputs the generated image data to the central ECU 50.

Like the cameras 101, the radars 102 are respectively arranged so that their detection ranges will be scattered 360° horizontally around the vehicle. The radars 102 are not limited to a particular type, and, for example, millimeter-wave radars or infrared radars may be adopted.

Like information from the cameras 101 or the radars 102, a signal from each sensor 100 may be directly input to the central ECU 50, or may be input to the central ECU 50 via a zone ECU 60 and/or the like.

The central ECU 50 is, for example, a processor composed of one or more chips. The central ECU 50 includes a recognition unit 51, which recognizes outside-vehicle environment information by using an A. (Artificial intelligence) function based on information from the cameras 101 and the radars 102. The central ECU 50 includes a path calculation unit 52, which calculates a path that the vehicle should take on the basis of the outside-vehicle environment information recognized by the recognition unit 51. The central ECU 50 includes a vehicle movement management unit 53, which calculates the target output of a basic device on the basis of the outside-vehicle environment information recognized by the recognition unit 51 and the path calculated by the path calculation unit 52. The central ECU 50 includes a body-system management unit 54, which controls the operation of a body-system device on the basis of the outside-vehicle environment information recognized by the recognition unit 51 and the path calculated by the path calculation unit 52.

When the vehicle is manually driven or is driven with assistance, the central ECU 50 calculates the driving force, braking force, and steering angle that each in-vehicle device should output on the basis of the detection value of the accelerator opening sensor, brake pedal sensor, steering angle sensor, or the like. The central ECU 50 generates target signals representing the calculated driving force, braking force, and steering angle, that is, the target values of the driving force, braking force, and steering angle to be realized by each in-vehicle device. In particular, when the vehicle is driven with assistance, the central ECU 50 takes into consideration the target movement of the vehicle, which will be described later, when calculating the driving force, braking force, and steering angle.

To enable the autonomous driving or assisted driving of the vehicle, the central ECU 50 recognizes, using the recognition unit 51, the outside-vehicle environment information, and calculates, using the path calculation unit 52, the path that the vehicle should take. The central ECU 50 determines the vehicle movement for following the path calculated by the path calculation unit 52.

On receipt of information from the plurality of sensors 100, the recognition unit 51 of the central ECU 50 recognizes the outside-vehicle environment information of the vehicle. The outside-vehicle environment information includes the state of a target, road state, surrounding brightness, etc. Information on a target includes the relative position and relative speed of the target with respect to the local vehicle, the attributes (type and moving direction) of the target, etc. The types of targets include, for example, other vehicles, pedestrians, roads, and lane lines. Road information includes information on the shape of the road itself. Information on the road shape includes the road shape (straight, curve, and curvature), road width, the number of lanes, and the width of each lane.

The recognition unit 51 generates a 3D map indicating the outside vehicle environment by integrating information such as the relative distance to a target, which is obtained using the radars 102, with outside-vehicle images captured using the cameras 101 and the target recognition results. On the basis of the generated 3D map, the recognition unit 51 generates a 2D map for calculating the driving path of the vehicle The path calculation unit 52 of the central ECU 50 calculates the driving path of the vehicle on the basis of the 2D map generated by the recognition unit 51. On the basis of the 2D map, the path calculation unit 52 calculates a driving path for avoiding an obstacle recognized by the recognition unit 51. The path calculation unit 52 calculates a plurality of candidate paths by using, for example, the state lattice, and selects one or more candidate paths from the plurality of candidate paths on the basis of the path cost of each of the candidate paths. Note that the path calculation may be performed using other methods.

The vehicle movement management unit 53 of the central ECU 50 determines the target movement of the vehicle for following the calculated driving path, and calculates the driving force, braking force, and steering angle for realizing the determined target movement. The vehicle movement management unit 53 generates a target signal representing the calculated driving force, braking force, and steering angle, that is, the target state of the driving force, braking force, and steering angle to be realized by each basic device. The target signal is output as a digital signal.

The body-system management unit 54 of the central ECU 50 generates a control signal for a body-system device unrelated to the drive control, brake control, or steering control of the vehicle on the basis of the recognized outside-vehicle environment information and the calculated driving path. For example, when it is recognized by the recognition unit 51 that it is dark around, the body-system management unit 54 generates a control signal to be sent to the headlights 31 to turn on the headlights 31; or, when a window is open at the time the vehicle enters a tunnel, the body-system management unit 54 generates a control signal to be sent to the P/W device 21 to close the window. The control signal for the body-system device is also output as a digital signal.

On the basis of information obtained by a sensor that detects the state of a passenger, the body-system management unit 54 estimates the state of a passenger in the vehicle compartment using a learned model generated by deep learning. The state of a passenger means the health state or feeling of a passenger. The health state of a passenger includes, for example, healthy, mild fatigue, poor physical condition, decreased consciousness, etc. The feeling of a passenger includes, for example, having fun, normal, bored, irritated, unpleasant, etc. The body-system management unit 54 generates various control signals by additionally taking into consideration the health state of a passenger and/or the feeling of a passenger. For example, when the temperature in the vehicle compartment is high and it is estimated that a passenger is not feeling well, the body-system management unit 54 activates an air conditioning or activates the P/W device 21 to open a window.

The recognition unit 51, the path calculation unit 52, the vehicle movement management unit 53, and the body-system management unit 54 are examples of modules stored in the central ECU 50.

The zone ECUs 60 are each provided on communication paths between the central ECU 50 and each in-vehicle device, and for each certain zone of the vehicle. Each zone ECU 60 configures a relay apparatus that relays a control signal generated by the central ECU 50. In the present embodiment, a zone ECU 60 arranged on the right front side of the vehicle may sometimes be referred to as a first zone ECU 61. Zones may be defined arbitrarily. As the number of zones increases, the number of zone ECUs 60 also increases.

As illustrated in FIG. 1, each zone ECU 60 is connected to the central ECU 50 by a main communication line MCL. Two zone ECUs 60 are also connected to each other by a main communication line MCL. Note that the main communication line MCL connecting the central ECU 50 and each zone ECU 60 and the main communication line MCL connecting two zone ECUs 60 are composed of, for example, ETHERNET (registered trademark) communication cables.

In contrast, each zone ECU 60 and each in-vehicle device are connected using a sub communication line SCL. The sub communication line SCL is composed of, for example, a CAN communication cable. As illustrated in FIG. 2, each zone ECU 60 is provided with a gateway 60*a*. Each gateway 60*a* has the function of performing protocol conversion from ETHERNET (registered trademark) to CAN.

Next, the network configuration of each in-vehicle device connected to a zone ECU 60 will be described. Here, referring to FIG. 2, the network configuration of in-vehicle devices connected to the first zone ECU 61 will be described. Note that the in-vehicle devices illustrated in FIG. 2 are examples of in-vehicle devices connected to the first zone ECU 61, and this does not exclude an in-vehicle device other than these in-vehicle devices being connected to the first zone ECU 61.

As illustrated in FIG. 2, the first zone ECU 61 is connected to, for example, the engine system 11, the EPS device 12, the P/W device 21 of the right front side door, the keyless entry device 22 of the right front side door, and the left and right headlights 31 respectively by using sub communication lines SCL. Although the illustration of other in-vehicle devices connected to the first zone ECU 61 is omitted in FIG. 2, the first zone ECU 61 may also be connected to other in-vehicle devices.

An engine ECU 41, which controls the engine system 11 on the basis of a control signal (target signal) relayed by the first zone ECU 61, is provided on a communication path between the first zone ECU 61 and the engine system 11. In short, the engine system 11 is connected to the first zone ECU 61 via the engine ECU 41. The first zone ECU 61 converts the protocol of information sent from the central ECU 50, and then transmits the converted information to the engine ECU 41. The engine ECU 41 is an example of a specific control apparatus. Like the central ECU 50 and each zone ECU 60, the engine ECU 41 is a piece of computer hardware, and specifically includes a processor including a CPU, a memory storing a plurality of modules, etc.

The engine ECU 41 includes a first specific arithmetic unit 41*a*, which calculates the control amount (such as the opening of the throttle valve, the injection timing of the fuel injection valve, etc.) of the engine system 11, and a first signal processing unit 41*b*, which generates an analog signal for the engine system 11. The first specific arithmetic unit 41*a* and the first signal processing unit 41*b* are examples of modules stored in the engine ECU 41.

In absence of abnormality of communication between the central ECU 50 and the engine ECU 41, the first specific arithmetic unit 41*a* calculates, on the basis of a signal of the target driving force transmitted from the central ECU 50, the control amount of the engine system 11 so that the engine system 11 will realize the target driving force. The first signal processing unit 41*b* generates and outputs an analog signal for each actuator of the engine system 11 so that the control amount calculated by the first specific arithmetic unit 41*a* will be realized.

The engine ECU 41 is configured to be capable of obtaining information from one or some of the plurality of sensors, particularly a sensor that detects a value related to the output of the engine system 11. For example, the engine ECU 41 is configured to be capable of obtaining the output of the accelerator opening sensor, engine speed sensor, cylinder pressure sensor, engine water temperature sensor, etc. These sensors including the accelerator opening sensor, engine speed sensor, cylinder pressure sensor, and engine water temperature sensor are examples of a second specific sensor.

The engine ECU 41 includes a first communication diagnosis unit 41c, which diagnoses an abnormality of communication between the engine ECU 41 and the central ECU 50. The first communication diagnosis unit 41c transmits a first test signal for communication diagnosis to the central. ECU 50 via the first zone ECU 61. Having received the first test signal from the first communication diagnosis unit 41c, the central ECU 50 returns a second test signal indicating the reception of the first test signal to the first communication diagnosis unit 41c. Having received the second test signal from the central ECU 50, the first communication diagnosis unit 41c determines that there is no abnormality of communication between the central ECU 50 and the engine ECU 41. In contrast, when the first communication diagnosis unit 41c is unable to receive the second test signal from the central ECU 50, the first communication diagnosis unit 41c determines that there is an abnormality of communication between the central ECU 50 and the engine ECU 41. Note that an abnormality of the communication state is that, for example, the main communication line MCL is broken. The first communication diagnosis unit 41c is an example of a module stored in the engine ECU 41.

In occurrence of abnormality of communication between the central ECU 50 and the engine ECU 41, the engine ECU 41 controls, by using the first specific arithmetic unit 41a, the engine system 11 on the basis of a signal from a sensor 100 input to the engine ECU 41. Unlike the central ECU 50, the first specific arithmetic unit 41a does not perform control in accordance with the outside-vehicle environment, and only performs control of the engine system 11 based on the vehicle passenger's operation.

For part of control of the engine system 11, the engine ECU 41 generates a control signal for the engine system 11 by using the first specific arithmetic unit 41a on the basis of a signal from a sensor 100, etc., regardless of abnormality of communication between the central ECU 50 and the engine ECU 41. For example, when the engine water temperature detected by the engine water temperature sensor is high and knocking may occur in the engine, the engine ECU 41 generates, without having to go through the central ECU 50, a control signal so as to delay the injection timing of the fuel injection valve or the ignition timing of a spark plug. In this manner, the engine ECU 41 has a reflection control function for controlling the engine system 11 without having to go through the central ECU 50.

An EPS ECU 42, which controls the EPS device 12 on the basis of a control signal (target signal) relayed by the first zone ECU 61, is provided on a communication path between the first zone ECU 61 and the EPS device 12. In short, the EPS device 12 is connected to the first zone ECU 61 via the EPS ECU 42. The first zone ECU 61 converts the protocol of information sent from the central. ECU 50, and then transmits the converted information to the EPS ECU 42. The EPS ECU 42 is an example of a specific control apparatus. Like the central ECU 50 and each zone ECU 60, the EPS ECU 42 is a piece of computer hardware, and specifically includes a processor including a CPU, a memory storing a plurality of modules, etc.

The EPS ECU 42 includes a second specific arithmetic unit 42a, which calculates the control amount (such as the amount of current supplied to an electric motor for assistance) of the EPS device 12, and a second signal processing unit 42b, which generates an analog signal for the EPS device 12. The second specific arithmetic unit 42a and the second signal processing unit 42b are examples of modules stored in the EPS ECU 42.

The second specific arithmetic unit 42a calculates, on the basis of information of the target steering angle, which is transmitted from the central ECU 50, the control amount of the EPS device 12 so that the EPS device 12 will realize the target steering angle. The second signal processing unit 42b generates and outputs an analog signal for the EPS device 12 so that the control amount calculated by the second specific arithmetic unit 42a will be realized.

The EPS ECU 42 is configured to be capable of obtaining information from one or some of the plurality of sensors, particularly a sensor that detects a value related to the output of the EPS device 12. In the present embodiment, the EPS ECU 42 is configured to be capable of obtaining at least the output of the steering angle sensor, vehicle speed sensor, engine speed sensor, etc. These sensors including the steering angle sensor and the vehicle speed sensor are examples of a second specific sensor.

The EPS ECU 42 includes a second communication diagnosis unit 42c, which diagnoses an abnormality of communication between the EPS ECU 42 and the central ECU 50. The second communication diagnosis unit 42c diagnoses an abnormality of communication between the EPS ECU 42 and the central ECU 50 using a method which is the same as or similar to the first communication diagnosis unit 41c of the engine ECU 41. The second communication diagnosis unit 42c is an example of a module stored in the EPS ECU 42.

In occurrence of abnormality of communication between the central ECU 50 and the EPS ECU 42, the EPS ECU 42 controls, by using the second specific arithmetic unit 42a, the EPS device 12 on the basis of a signal from a sensor 100 input to the EPS ECU 42. Unlike the central ECU 50, the second specific arithmetic unit 42a does not perform control in accordance with the outside-vehicle environment, and only performs control of the EPS device 12 based on the vehicle passenger's operation.

Unlike the engine system 11 or the EPS device 12, the P/W device 21 is such that a function (third signal processing unit 21a) that outputs a signal to an actuator (window regulator, etc.) is built in the device. This is because the P/W device 21 is only for opening/closing a window glass using an ON/OFF signal, and the signal itself is simple.

The P/W device 21 is configured in such a manner that a signal from, among the sensors 100, a sensor related only to the operation of the P/W device 21 is directly input to the P/W device 21. This sensor is, for example, a switch (hereinafter referred to as a P/W switch 103) for activating the power window device.

The third signal processing unit 21a outputs a signal for activating the power window device 21 when a passenger of the vehicle presses the P/W switch 103. Specifically, when a passenger of the vehicle presses the P/W switch 103, the P/W switch 103 inputs a switch signal (ON signal) for directly activating the P/W device 21 to the P/W device 21. The switch signal is directly input to the P/W device 21, and is input to the central ECU 50 via the P/W device 21 and the first zone ECU 61. Having received the switch signal, the P/W device 21 outputs, by using the third signal processing unit 21a, a control signal for activating an actuator 21b as an analog signal. From this fact, the third signal processing unit 21a corresponds to a sub controller that controls the actuator 21b on the basis of the output of at least one or some of the sensors (P/W switch 103). In addition, the P/W switch 103 corresponds to a first specific sensor only related to the operation of the P/W device 21.

When the third signal processing unit 21a receives a control signal for activating the actuator 21b from the central ECU 50 in absence of abnormality of communication between the central ECU 50 and the P/W device 21, the third signal processing unit 21a converts the control signal to an analog signal. The third signal processing unit 21a transmits the converted analog signal to the actuator 21b to activate the actuator 21b. A control signal from the central ECU 50 is a control signal generated by the central ECU 50 on the basis of outside-vehicle environment information, which is obtained from the output of each sensor 100 and which is related to the external environment of the vehicle. This control signal is a signal for activating the P/W device 21, separately from the above-mentioned switch signal.

When a control signal from the central ECU 50 and a switch signal of the P/W switch 103 are input at substantially the same time, the third signal processing unit 21a gives priority to the switch signal of the P/W switch 103. That is, the third signal processing unit 21a is configured to, in response to an input of a switch signal from the P/W switch 103, control the actuator 21b on the basis of the switch signal from the P/W switch 103, regardless of a control signal from the central ECU 50.

The P/W device 21 includes a third communication diagnosis unit 21c, which diagnoses an abnormality of communication between the P/W device 21 and the central ECU 50. The third communication diagnosis unit 21c diagnoses an abnormality of communication between the P/W device 21 and the central ECU 50 using a method which is the same as or similar to the first communication diagnosis unit 41c of the engine ECU 41.

In occurrence of abnormality of communication between the central ECU 50 and the P/W device 21, the P/W device 21 controls, by using the third signal processing unit 21a, the actuator 21b on the basis of a signal input from a sensor 100 (particularly the P/W switch 103) to the P/W device 21. Unlike the central ECU 50, the third signal processing unit 21a does not perform control in accordance with the outside-vehicle environment, and only performs control of the actuator 21b based on the vehicle passenger's operation.

Like the P/W device 21, the keyless entry device 22 is such that a function (fourth signal processing unit 22a) that outputs a signal to an actuator 22b (door lock mechanism, etc.) is built in the device. This is because the keyless entry device 22 is only for opening/closing the door lock using an ON/OFF signal, and the signal itself is simple.

The keyless entry device 22 is configured in such a manner that, among the sensors 100, a signal from the sensors related only to the operation of the keyless entry device 22 is directly input to the keyless entry device 22. Specifically, the keyless entry device 22 includes a receiving unit 22d, which receives a signal from a portable device 104 carried by a passenger.

When the receiving unit 22d receives a signal for unlocking the door lock (hereinafter referred to as an unlock signal), the fourth signal processing unit 22a outputs a control signal for unlocking the door lock. Specifically, when the receiving unit 22d receives an unlock signal from a passenger's portable device 104, the receiving unit 22d informs the fourth signal processing unit 22a of the reception of the unlock signal. The unlock signal is not input to the central ECU 50, but is input only to the keyless entry device 22. Having received the signal from the receiving unit 22d, the fourth signal processing unit 22a outputs, as an analog signal, a control signal for activating the actuator 22b to unlock the door lock. When the receiving unit 22d receives a signal for locking the door lock, the fourth signal processing unit 22a similarly outputs, as an analog signal, a control signal for activating the actuator 22b to lock the door lock. From this fact, the fourth signal processing unit 22a corresponds to a sub controller that controls the actuator 22b on the basis of the output of at least one or some of the sensors (portable device 104). In addition, the portable device 104 corresponds to a first specific sensor only related to the operation of the keyless entry device 22.

When the fourth signal processing unit. 22a receives a control signal for activating the actuator 22b from the central ECU 50 in absence of abnormality of communication between the central ECU 50 and the keyless entry device 22, the fourth signal processing unit 22a converts the control signal to an analog signal. The fourth signal processing unit 22a transmits the converted analog signal to the actuator 22b to activate the actuator 22b. A control signal from the central ECU 50 is a control signal generated by the central ECU 50 on the basis of outside-vehicle environment information, which is obtained from the output of each sensor 100 and which is related to the external environment of the vehicle. This control signal is a signal for activating the keyless entry device 22, separately from a signal from the above-mentioned portable device 104.

When a control signal from the central ECU 50 and a signal from the receiving unit 22d are input at substantially the same time, the fourth signal processing unit 22a gives priority to the signal from the receiving unit 22d (that is, the signal indicating that a signal from the portable device 104 has been received). That is, the fourth signal processing unit 22a is configured to, in response to an input of a signal from the receiving unit 22d, control the actuator 22b on the basis of the signal from the receiving unit 22d, regardless of a control signal from the central ECU 50.

The keyless entry device 22 includes a fourth communication diagnosis unit 22c, which diagnoses an abnormality of communication between the keyless entry device 22 and the central ECU 50. The fourth communication diagnosis unit 22c diagnoses an abnormality of communication between the keyless entry device 22 and the central ECU 50 using a method which is the same as or similar to the first communication diagnosis unit 41c of the engine ECU 41.

In occurrence of abnormality of communication between the central ECU 50 and the keyless entry device 22, the keyless entry device 22 controls, by using the fourth signal processing unit 22a, the actuator 22b on the basis of a signal input from a sensor 100 (particularly the portable device 104) to the keyless entry device 22. At this time, unlike the central ECU 50, the fourth signal processing unit 22a does not perform control in accordance with the outside-vehicle environment, and only performs control of the actuator 22b based on the vehicle passenger's operation.

The headlights 31 are configured in such a manner that, unlike other devices, an analog signal for activation is directly input from the first zone ECU 61 to the headlights 31. This is because the headlights 31 are devices that belong to the above-mentioned fixed devices, and simply need to be in an activated state in the event of communication abnormality.

The headlights 31 are connected to a port where an input/output device 61a in the first zone ECU 61 is provided. The input/output device 61a has a function of converting a digital signal transmitted from the central ECU 50 to an analog signal.

When a signal from the central ECU 50 is no longer received, the input/output device 61*a* transmits an ON signal to the headlights 31 so that the headlights 31 will be maintained in a lit state.

Here, in occurrence of communication abnormality such as a control signal from the central ECU 50 being no longer received due to the breakage of a communication line or the like, it becomes difficult for the in-vehicle devices to operate normally. Like the related art, in occurrence of abnormality of the main communication line MCL and the sub communication line SCL for obtaining information from the central ECU 50, it is conceivable to form a detour path to enable a signal from the central ECU 50 to be transmitted. However, the in-vehicle devices include devices related to the basic operations of the vehicle, such as the engine system 11 and the EPS device 12, and selective devices that are unrelated to the basic operations of the vehicle, but are required to make a determination in accordance with the vehicle situation and to have high responsiveness, such as the P/W device 21 and the keyless entry device 22. Using a detour path as in the related art may elongate the communication time and lower the responsiveness.

In contrast, in the present embodiment, the selective devices such as the P/W device 21 and the keyless entry device 22 include sub controllers (such as the third and fourth signal processing units 21*a* and 22*a*) therein. The sub controllers are capable of controlling actuators in accordance with one or some of the sensors 100. Therefore, even in the event of communication abnormality (here, the breakage of a communication line), with the sub controllers, the selective devices may be controlled in accordance with the output of one or some of the sensors 100. By building a sub controller in a selective device as above, an elongation of the communication path in the event of communication abnormality may be suppressed, thereby achieving high responsiveness even in the event of communication abnormality. Therefore, for a selective device, redundancy may be enhanced, and responsiveness as high as possible may be achieved even in the event of communication abnormality.

In particular, in the present embodiment, a sub controller is configured to, in response to an input of a signal from a corresponding first specific sensor such as the P/W switch 103 or the portable device 104 in absence of abnormality of communication with the central ECU 50, control an actuator on the basis of a signal from the first specific sensor, regardless of a control signal from the central ECU 50. Accordingly, even in absence of abnormality of communication with the central ECU 50, control based on a signal from the first specific sensor may be executed only by the sub controller. Therefore, a communication path when activating the actuator using a signal from the first specific sensor remains the same regardless of the presence or absence of abnormality of communication with the central ECU 50. As a result, high responsiveness may be more easily achieved even in the event of abnormality of communication with the central ECU 50.

In the present embodiment, a plurality of in-vehicle devices include a basic device (e.g., the engine system 11 or the EPS device 12) which is an in-vehicle device related to drive control, brake control, or steering control of the vehicle. The basic device is connected to a zone ECU 60 via a specific control apparatus (such as the engine ECU 41 or the EPS ECU 42) that controls the basic device. The specific control apparatus includes a specific arithmetic unit (such as the first specific arithmetic unit 41*a* or the second specific arithmetic unit 42*a*) to which a detection signal from a second specific sensor among the plurality of sensors is input, the second specific sensor detecting a value related to an output of the basic device, the specific arithmetic unit being capable of generating a control signal for the basic device based on a signal from the second specific sensor. The specific arithmetic unit generates a control signal for the basic device in occurrence of abnormality of communication between the central ECU 50 and the basic device. Accordingly, the basic device may also be controlled by the specific control apparatus in occurrence of abnormality of communication with the central ECU 50. Accordingly, redundancy of the basic device may be enhanced. In addition, because the specific control apparatus is provided on a communication path between a zone ECU 60 and the basic device, the time of communicating a control signal from the specific control apparatus to the basic device may be shortened as much as possible.

In addition, in the present embodiment, in absence of abnormality of communication between the central ECU 50 and the basic device, the specific arithmetic unit generates a control signal for the basic device so as to make an output of the basic device a target output calculated by the central ECU 50. That is, in absence of abnormality of communication between the central ECU 50 and the basic device, the actual control amount of the basic device is calculated by the specific control apparatus. In contrast, in occurrence of abnormality of communication between the central ECU 50 and the basic device, control is control that calculates, by the specific control apparatus, the control amount of the basic device based on a value related to an output of the second specific device, which is detected by the second specific sensor. That is, the operation of the specific control apparatus remains almost unchanged even in occurrence of abnormality of communication between the central ECU 50 and the basic device. As a result, deterioration of responsiveness for the second device is effectively suppressed even in the event of abnormality of communication between the central ECU 50 and the basic device.

Furthermore, in the present embodiment, regardless of the presence or absence of abnormality of communication between the central ECU 50 and the basic device, for part of control of the basic device, the specific arithmetic unit generates a control signal for the basic device based on a signal from the second specific sensor. Accordingly, control that requires particularly high responsiveness, such as control for suppressing knocking in the engine system 11, may be executed by the specific control apparatus, without having to go through a central arithmetic apparatus. Accordingly, for a basic device whose control particularly requires responsiveness, redundancy may be enhanced, and particularly high responsiveness may be achieved even in the event of communication abnormality.

The technology disclosed herein is not limited to the above-described embodiment, and substitutions may be made without departing from the scope of the claims.

For example, in the above-described embodiment, a signal from the first specific sensor such as the P/W switch 103 or the portable device 104 is input only to a corresponding selective device. This is not the only possible case, and a signal from the first specific sensor may also be input to the central ECU 50. In this case, for example, in absence of abnormality of communication between the central ECU 50 and a selective device, control of an actuator based on an output of the first specific sensor may be executed by the central ECU 50, whereas, in the presence of abnormality of communication between the central ECU 50 and a selective device, control of an actuator based on an output of the first specific sensor may be executed by a sub controller (such as the third signal processing unit 21a or the fourth signal processing unit 22a).

Although the above-described embodiment targets vehicles capable of autonomous driving, the embodiment may target vehicles capable of manual driving and assisted driving but not capable of autonomous driving.

The above-described embodiment is merely illustrative and should not be construed to limit the scope of the present disclosure. The scope of the present disclosure is defined by the claims, and any modifications or changes that fall within the equal scope of the claims are within the scope of the present disclosure.

INDUSTRIAL APPLICABILITY

The technology disclosed herein is useful in an in-vehicle network system when, for a specific device, enhancing redundancy and achieving as high responsiveness as possible even in the event of communication abnormality.

REFERENCE SIGNS LIST 1 in-vehicle network system
11 engine system (second specific device)
12 EPS device (second specific device)
21 power window device (first specific device)
21a third signal processing unit (sub controller)
21c actuator
22 keyless entry device (first specific device)
22a fourth signal processing unit (sub controller)
22c actuator
41 engine ECU (specific control apparatus)
41a first specific arithmetic unit (specific arithmetic unit)
42 EPS ECU (specific control apparatus)
42a second specific arithmetic unit (specific arithmetic unit)
50 central ECU (central control apparatus)
60 zone ECUs (relay apparatuses)
61 first zone ECU (relay apparatus)
100 sensors
103 P/W switch (first specific sensor)
104 portable device (first specific sensor)

The invention claimed is:
1. An in-vehicle network system comprising:
a plurality of sensors;
a central control apparatus configured to generate control signals for a plurality of devices based on outputs of the sensors; and
a plurality of relay apparatuses, each being provided on communication paths between the central control apparatus and at least one of the devices, configured to relay the control signals generated by the central control apparatus, wherein
the plurality of devices includes a first specific device, which is a device unrelated to drive control, brake control, or steering control of a vehicle, and which includes a sub controller capable of activating an actuator based on an ON signal from at least one of the sensors,
the first specific device is configured to control the actuator by using the sub controller in occurrence of abnormality of communication between the central control apparatus and the first specific device,
a signal from, among the plurality of sensors, a first specific sensor only related to operation of the first specific device is configured to be directly input to the first specific device,
the central control apparatus is further configured to generate a control signal for the first specific device based on outside-vehicle environment information, which is information obtained from the outputs of the sensors and which is related to external environment of the vehicle, and
in response to an input of the control signal for the first specific device that the central control apparatus generated based on the outside-vehicle environment information in absence of abnormality of communication, the sub controller of the first specific device is configured to control the actuator based on the control signal for the first specific device, whereas, in response to an input of the signal from the first specific sensor, the sub controller is configured to control the actuator based on the signal from the first specific sensor, regardless of the control signal for the first specific device generated by the central control apparatus.

2. The in-vehicle network system according to claim 1, wherein
the plurality of devices includes a second specific device, which is related to drive control, brake control, or steering control of the vehicle,
the second specific device is connected to one of the relay apparatuses via a specific control apparatus that controls the second specific device,
the specific control apparatus includes a specific arithmetic unit to which a detection signal from a second specific sensor among the plurality of sensors is input, the second specific sensor detecting a value related to an output of the second specific device, the specific arithmetic unit being capable of generating a control signal for the second specific device based on the detection signal from the second specific sensor, and
the specific arithmetic unit is configured to generate the control signal for the second specific device in occurrence of abnormality of communication between the central control apparatus and the second specific device.

3. The in-vehicle network system according to claim 2, wherein
the central control apparatus is configured to calculate a target output of the second specific device based on outside-vehicle environment information, which is information obtained from the outputs of the sensors and which is related to external environment of the vehicle, and
the specific arithmetic unit is configured to, in absence of abnormality of communication between the central control apparatus and the second specific device, generate the control signal for the second specific device so as to make the output of the second specific device the target output calculated by the central control apparatus.

4. The in-vehicle network system according to claim 3, wherein
regardless of presence or absence of abnormality of communication between the central control apparatus and the second specific device, for part of control of the second specific device, the specific arithmetic unit is configured to generate the control signal for the second specific device based on the detection signal from the second specific sensor.

5. The in-vehicle network system according to claim 2, wherein
regardless of presence or absence of abnormality of communication between the central control apparatus and the second specific device, for part of control of the second specific device, the specific arithmetic unit is configured to generate the control signal for the second specific device based on the detection signal from the second specific sensor.

6. An in-vehicle network system comprising:
a plurality of sensors;
a central control apparatus configured to generate control signals for a plurality of devices based on outputs of the sensors; and
a plurality of relay apparatuses, each being provided on communication paths between the central control apparatus and at least one of the devices, configured to relay the control signals generated by the central control apparatus, wherein
the plurality of devices includes a first specific device, which is unrelated to drive control, brake control, or steering control of a vehicle, and which includes a sub controller capable of activating an actuator based on an ON signal from at least one of the sensors,
the first specific device is configured to control the actuator by using the sub controller in occurrence of abnormality of communication between the central control apparatus and the first specific device,
the plurality of devices includes a second specific device, which is related to drive control, brake control, or steering control of the vehicle,
the second specific device is connected to one of the relay apparatuses via a specific control apparatus that controls the second specific device,
the specific control apparatus includes a specific arithmetic unit to which a detection signal from a second specific sensor among the plurality of sensors is input, the second specific sensor detecting a value related to an output of the second specific device, the specific arithmetic unit being capable of generating a control signal for the second specific device based on the detection signal from the second specific sensor, and
the specific arithmetic unit is configured to generate the control signal for the second specific device in occurrence of abnormality of communication between the central control apparatus and the second specific device.

7. The in-vehicle network system according to claim 6, wherein
the central control apparatus is configured to calculate a target output of the second specific device based on outside-vehicle environment information, which is information obtained from the outputs of the sensors and which is related to external environment of the vehicle, and
the specific arithmetic unit is configured to, in absence of abnormality of communication between the central control apparatus and the second specific device, generate the control signal for the second specific device so as to make the output of the second specific device the target output calculated by the central control apparatus.

8. The in-vehicle network system according to claim 7, wherein
regardless of presence or absence of abnormality of communication between the central control apparatus and the second specific device, for part of control of the second specific device, the specific arithmetic unit is configured to generate the control signal for the second specific device based on the detection signal from the second specific sensor.

9. The in-vehicle network system according to claim 8, wherein
a signal from, among the plurality of sensors, a first specific sensor only related to operation of the first specific device is configured to be directly input to the first specific device,
the central control apparatus is further configured to generate a control signal for the first specific device based on outside-vehicle environment information, which is information obtained from the outputs of the sensors and which is related to external environment of the vehicle, and
in response to an input of the control signal for the first specific device that the central control apparatus generated based on the outside-vehicle environment information in absence of abnormality of communication, the sub controller of the first specific device is configured to control the actuator based on the control signal for the first specific device, whereas, in response to an input of the signal from the first specific sensor, the sub controller is configured to control the actuator based on the signal from the first specific sensor, regardless of the control signal for the first specific device generated by the central control apparatus.

10. The in-vehicle network system according to claim 6, wherein
regardless of presence or absence of abnormality of communication between the central control apparatus and the second specific device, for part of control of the second specific device, the specific arithmetic unit is configured to generate the control signal for the second specific device based on the detection signal from the second specific sensor.

11. The in-vehicle network system according to claim 6, wherein
a signal from, among the plurality of sensors, a first specific sensor only related to operation of the first specific device is configured to be directly input to the first specific device,
the central control apparatus is further configured to generate a control signal for the first specific device based on outside-vehicle environment information, which is information obtained from the outputs of the sensors and which is related to external environment of the vehicle, and
in response to an input of the control signal for the first specific device that the central control apparatus generated based on the outside-vehicle environment information in absence of abnormality of communication, the sub controller of the first specific device is configured to control the actuator based on the control signal for the first specific device, whereas, in response to an input of the signal from the first specific sensor, the sub controller is configured to control the actuator based on the signal from the first specific sensor, regardless of the control signal for the first specific device generated by the central control apparatus.

12. The in-vehicle network system according to claim 6, wherein
a signal from, among the plurality of sensors, a first specific sensor only related to operation of the first specific device is configured to be directly input to the first specific device, the central control apparatus is further configured to generate a control signal for the first specific device based on outside-vehicle environment information, which is information obtained from the outputs of the sensors and which is related to external environment of the vehicle, and in response to an input of the control signal for the first specific device that the central control apparatus generated based on the outside-vehicle environment information in absence of abnormality of communication, the sub controller of the first specific device is configured to control the actuator based on the control signal for the first specific device, whereas, in response to an input of the signal from the first specific sensor, the sub controller is configured to control the actuator based on the signal from the first specific sensor, regardless of the control signal for the first specific device generated by the central control apparatus.

* * * * *